Feb. 22, 1949.　　　　E. J. ISTVAN　　　　2,462,102
MODULATED REFLECTING-RESONANT TARGET
Filed Aug. 2, 1945　　　　　　　　　　2 Sheets-Sheet 1
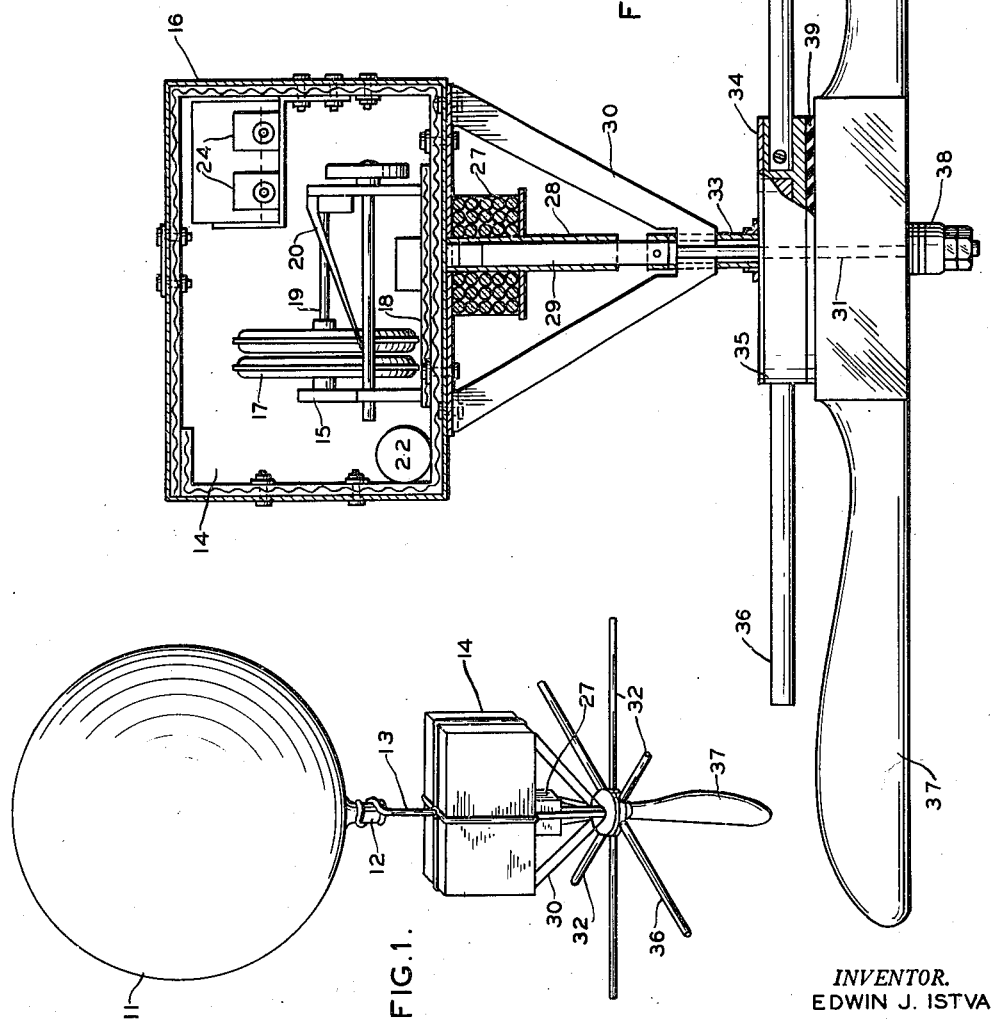
INVENTOR.
EDWIN J. ISTVAN
BY
　William D. Hall.
ATTORNEY Feb. 22, 1949.  E. J. ISTVAN  2,462,102
MODULATED REFLECTING-RESONANT TARGET
Filed Aug. 2, 1945  2 Sheets-Sheet 2

INVENTOR.
EDWIN J. ISTVAN
BY
ATTORNEY

Patented Feb. 22, 1949

2,462,102

UNITED STATES PATENT OFFICE 2,462,102

MODULATED REFLECTING-RESONANT TARGET

Edwin J. Istvan, Cleveland, Ohio

Application August 2, 1945, Serial No. 608,568

11 Claims. (Cl. 343—18)

(Granted under the act of March 3, 1883, as amended April 30, 1928; 370 O. G. 757)

The invention described herein may be manufacturerd and used by or for the Government for governmental purposes, without the payment to me of any royalty thereon.

This invention relates to signalling equipment, and more particularly, to artificial target units used for remote electronic signalling purposes.

It has been customary, up to the present time, to utilize targets known as corner reflectors, or simply suspend dipoles, for reflecting signals positively, back to a transmitting source, in aerial practice. The disadvantages of such were weight and unwieldiness in the first instance, and, in both types, the general reflection of the signals were of highly irregular amplitude, because of uncontrollable changes in orientation, with respect to the transmitting unit. There was also the difficulty of recognition of signals of specific modulation.

A modulated target unit in this invention is here designed as a radar target carried by a balloon or other aerial craft, which is capable of reflecting and retransmitting back the radar signals of different intensities, at particular times which are specifically controlled. Several methods for controlling these time intervals may be used, but of primary concern herein are those methods utilizing meteorological elements as the controlling mechanisms. The practical use of a modulated target requires that such a resonant target should be designed whose resonance could be destroyed at will, the theory propounded being that when the resonance was destroyed, the signal returned would decrease to a very small value. Corner reflectors, or simple suspended dipoles, reflect signals of highly irregular amplitude, because of uncontrollable changes in orientation with respect to the radar unit. These make difficult the recognition of a modulation. Tests on dipole targets having an array of two or three dipoles crossing, like spokes, in the horizontal plane and spaced at equal angles give signal returns which are very superior to the corner type reflector, previously used as a standard target. Tests on broken dipoles showed that a loss of at least 13 db. in return signal could be achieved by opening a quarter inch section at the quarter wave point of a target dipole. This indicated that a simple mechanical method could be devised to destroy the resonance of the crossed dipoles, as all could be opened simultaneously at the center point. In addition the dipoles are caused to rapidly rotate by supporting them on propeller-like members which are rotated by the relative vertical motion of the air due to the ascent rate of the balloon. The rotation of the dipoles thus secured produces an effective steady signal, upon which the modulation can be recognized. The method of destroying the resonance of the dipoles in this invention is accomplished by the use of a solenoid, which in turn acts upon and reciprocates a plunger core attached to a shorting plate assembly. In operation the R. F. energy travels on the surface of each section of the dipole segment. When the shorting plate is flush against the segments, the energy passes directly over its surface to the opposite antenna section forming a complete and resonant dipole antenna which reflectively radiates back energy to the transmitting radar. When the shorting or trammel plate is raised a predetermined distance from the segments by energizing the solenoid, the capacitive effect between the contact plate and segments is so small, as to prevent the passage of the R. F. energy from one quarter wave section to the other. This action effectively destroys the resonance of the dipole segments and causes the signal return to drop to a very small value. The current for operating the solenoid is controlled or closed by means of a suitable meteorological instrument, carried by the balloon in the target equipment, and automatically operating according to the atmospheric conditions.

It is an object of the present invention to provide a new and improved artificial remote electronic target that will avoid one or more of the disadvantages and limitations of targets previously developed in the prior art.

An additional object of this invention is to provide a new and improved artificial remote electronic target that will be capable of reflecting or retransmitting back signals of different intensities, at particular times, which are specifically controlled.

A further object of the present invention is to provide a new and improved artificial remote electronic target of such nature that its resonance can be destroyed or modified for predetermined timed periods.

A still further object of the invention is to provide a new and improved artificial remote electronic target of such structure that it can reflect or retransmit electronic signals continuously, effectively, and equably from any direction.

Still another object of the present invention is to provide a new and improved artificial remote electronic target having a relatively light structure, suitable for aerial transmission and inherently adapted to provide its own mechanical operation through the use of the potential power of position and travel aerially.

For a better understanding of the present invention, together with other and further objects thereof, reference is had to the following description taken in connection with the accompanying drawings, and its scope will be pointed out in the appended claims.

In accordance with the particular form described herein, an electronic target unit for aerial operation comprises an aerial means for carrying or substaining the unit through the atmosphere having an antenna for reflecting electronic signals from an external source. Means is carried by the aerial means for supporting the antenna and suspending same in a predetermined manner, so as to control the reflection of signals in a predetermined manner. It can be seen that this suspending means can include in its scope an antenna for reflecting electronic signals, and have electro-mechanical means for actuating the antenna, so as to increase the reception of signals received thereby from plural directions.

Referring now to the drawings:

Figure 1 is a perspective view of an electronic target unit embodying this invention;

Figure 2 is a detail in elevation, with portions broken away, to show internal construction of the operating mechanism and antenna used with the unit shown in Fig. 1;

Similar reference characters refer to similar parts throughout the drawing.

Figures 3, 4:
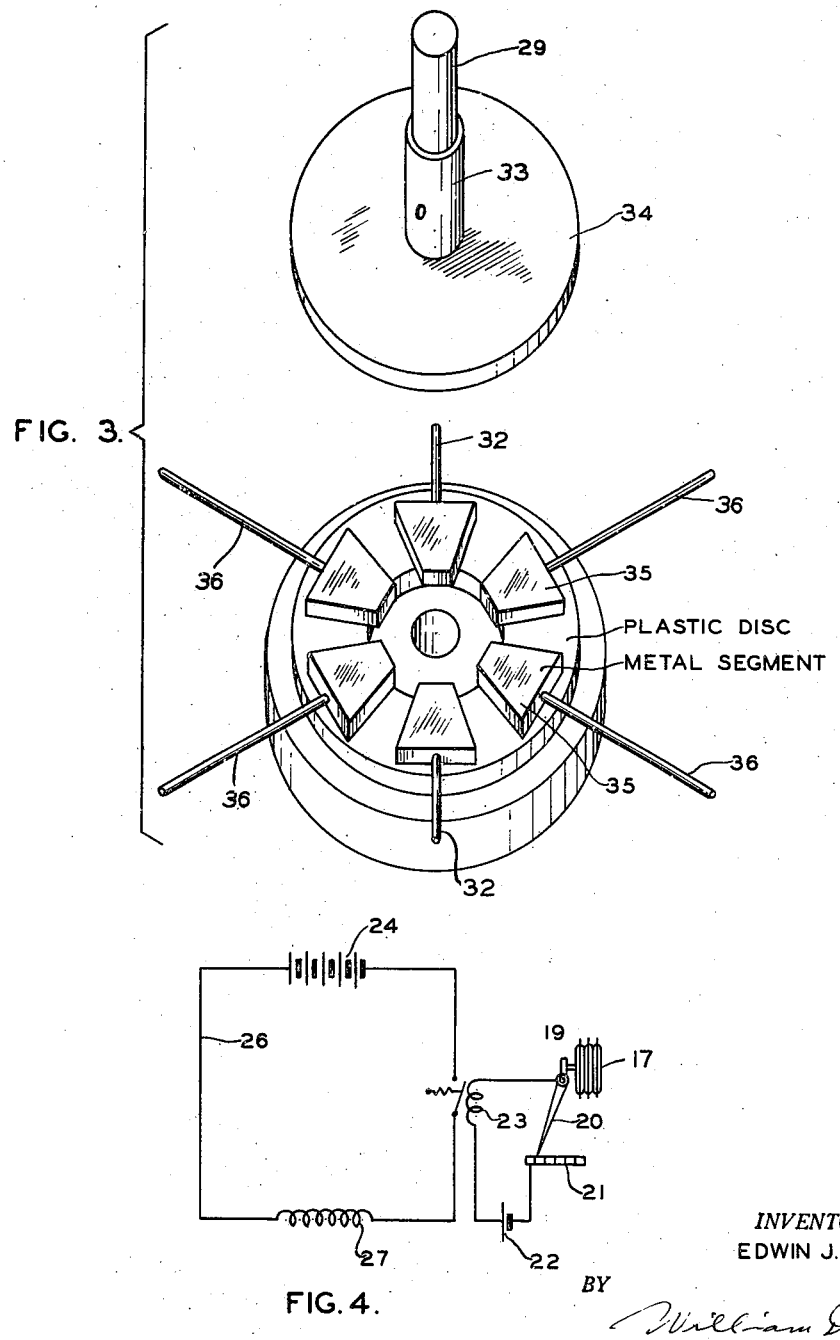
Figure 3 is a separated view of the dipole structure.
Figure 4 is a diagram of a preferred form of the network used in the operating mechanism.

In this particular form, the unit comprises an aerial means, which consists of a conventional balloon 11, that serves to carry a unit in the atmosphere. A netting can be used to connect the balloon and act as a saddle thereon, pending down over the tube 12 of the balloon and ending on a ring, and other suitable means for the equipment carried to be attached to. For general purposes, however, it is practical to tie a cord 13, or the like, on the tube 12 as its strength is sufficient to take the stresses. This latter connection has the advantage in aerial practice of allowing the balloon to expand to its limit without interference from a netting. The cord 13 is arranged to encompass a cabinet 14 holding any special instruments that determine the readings to be considered through the use of the unit. In this form of the invention, a baro-switch mechanism 15 is used and operated by the pressure of the atmosphere at different altitudes. The cabinet is made of some light, strong material, such as corrugated cardboard, with an outside cover 16 around it being used for reinforcing purposes. A suitable arrangement of diaphragms 17 that expand or decrease under the atmospheric pressures is mounted on a frame 18. It has a suitable mechanism 19 connected with the diaphragms 17 for operating an indicator and contact hand 20. The indicator 20 moves across the contact points 21 which are in series with suitable batteries 22 and relays 23. Batteries 24 for the secondary circuit indicated are held in this cabinet in a suitable box 25, and provide current through a circuit or network 26, connected with the respective elements thereof. A solenoid 27 is rigidly mounted on the exterior surface of the bottom of the cabinet 14. A tube 28 passes through the solenoid and acts as a guide and mechanical limit for an iron-core rod 29 which reciprocates in it. An apexed bracket 30 having a suitable number of light but strong arms is also secured to the bottom of the cabinet 14, and supports a stationary tubing 31 shaft, solid or hollow that sustains antenna legs 32. The bracket 30 has a passage therethrough that permits the shaft 31 supporting the antenna to be held securely thereby, and, also, for a bearing in the bracket for the antenna and propeller 37 to rotate thereon. A tubing 33 is attached to the core rod 29, so as to operate therewith. The lower portion of the tubing 33 is attached to a circular metal contact plate 34 that electrically and mechanically contacts a series of separated radially disposed segments 35 (six in number), holding the tubular dipole arms 32 and 36 of the antenna. There are other details in the structure for raising and lowering the shorting or trammel plate which, while not specifically mentioned, are understood to be included, for its proper mechanical operation, without being further outlined, as such are assumed to be obvious to those skilled in the art. These arms are arranged in radial spider-like form around the segments 35, and are of predetermined wave-length capacity. In this instance, a 56-inch wavelength (28" dipole length) is provided for one set of legs 36, while legs 32 are of another length to suit other requirements. The antenna (and propeller) rotates freely on its shaft 31, and is rigidly connected with the propeller 37 underneath both operating in parallel planes. A suitable arrangement 38 of nuts and thrust bearing is used for holding the propeller securely on the shaft. The propeller is of sufficient capacity to turn the antenna as the balloon rises through the atmosphere. Ordinarily, the rotation of the propeller is about 400 R. P. M. The segments 35 are insulated from each other by a plastic disc 39, which also has the propeller 37 attached to it underneath, so that the rotation of the propeller will rotate the disc and the segments on it. All are supported on the shaft 31 and rotate with it, in a bearing provided in the lower portion of the bracket, as shown.

The network used with the instrument is of a conventional type, and can employ a condenser, or other suitable electrical components, to improve its operation. Such a network has a relay 23 (indicated in Fig. 4), and appears to be self-explanatory. In the model described, the instant of contact gives the measure of pressure of the atmosphere through which the target travels. The contacts over whch the pointer brushes can be made to operate individually, to designate a specific code for each separate contact when brushed. Such a code can consist of an intermittent operation of the circuit with predetermined intervals to distinguish them. Actually, the relay 23 closes the circuit 26 and energizes the solenoid, through the latter. This can be provided by a network like that shown in the diagram. The network includes the solenoid which operates as the current passes through the same, and induces it to lift up the core rod with the trammel plate 34 attached to it. When the trammel plate 34 is raised sufficiently, it opens contact with the segments 35, so that they are electrically, as well as mechanically, disconnected from each other. The antenna dipole then becomes substantially unreflecting to specific signals. This is because it disrupts the wavelength adapted for two aligned antenna legs, when connected across as a single unit dipole. If the plate 34 is raised only a limited amount, the effect is capacitative and the dipole has significance for the same wavelength as the whole dipole, but in not-so-good condition for reflection. In other words, the reflective value would be impaired but not terminated. This effect, when a response of this nature is desirable, can be of value in modulating the signal reflected. This produces a modulated target. The structure of the target is understood to comply with the law in having a parachute arrangement for lowering the instruments with safety to the public. This can be provided in any conventional manner.

The operation of the unit is as follows:

The unit complete as indicated in Fig. 1 with the balloon inflated with a suitable light gas, the network energized, and provided with a parachute, is released to allow it to rise in the air. As the unit rises, the propeller means 37 is drawn through the air currents and rotated thereby. As the propeller means 37 is firmly connected to the antenna spokes or dipole halves, it rotates same with it. This rotation is normally about 400 R. P. M. The diaphragm of the baro-switch under the varying atmospheric pressures due to altitude, expands or contracts, and, in doing so, causes the pointer 20 to brush onto the contacts 21 at the corresponding pressure. The flow of current produced by the position of the pointer 20 on the respective contacts 21 energizes the solenoid and draws the core rod into its more intense field, which causes it, at one instant, to lift the trammel plate from contact with the face of the segments 35, and "break" the continuity of the antenna dipoles, leaving them in single arms extending radially from their individual segments 35 and of a different wavelength. At another instant, the solenoid drops the trammel plate 34 and allows it to short-circuit all the segments 35, and produce a spider-like dipole array extending out in diagonal pairs in a horizontal plane. An intermittent transmitter sending a signal of wavelength equal to that of the length of two diagonally-aligned half-dipoles of the antenna coupled together acts as a resonant dipole that will actuate the closed dipole array. The signal response is normally reflected back to the receiver when the trammel is down and in contact with the individual segments 35 of the half-dipoles, assuming that the unit is within range. In this case, the antenna is a resonant dipole. When the plate is raised by the solenoid mechanism, the legs, spokes or dipole halves are separated and their combined resonance disrupted, so they cannot reflect the signals of the same transmitter. Since the antenna is rotated at quite a high rate of speed through the operation of the propeller means 37, the resonant dipoles are likewise rotated and present a quasi-continuous directional resonant dipole at all angles around the axis they rotate about. This enables the reflecting signals to return at such a rate as to appear to be at full expression at all times. This is in contrast with the single-directional response of a corner reflector and others, which are practically uni-directional and of greatly varying amplitudes which are uncontrollable. In this invention, the result in the reflection is a stabilized signal. The propeller has another effect other than rotating the antenna, and that is, it tends to keep the array in a horizontal plane. The use of six pairs of legs to form three resonant dipoles is more or less arbitrary. In practice, such have been found sufficient, in view of the rotation, also those of lesser and greater number have been found to be effective. Likewise, other types of instruments, for registering humidity, temperature, and other atmospheric or artificial conditions are included in the scope of instruments that can be used with this unit for controlling the network to the solenoid and actuating means of the trammel plate. The target is designed primarily in the described form for radar signals, since it does not depend upon a radio transmitter to transmit information regarding temperature, pressure, etc. back to the receiver. An aerial-borne radio transmitter is referred to particularly in this regard. In addition, the range and direction of the target are also obtainable. The antenna structure is insulated from the trammel plate, supporting parts by a plastic disc 39, except through the face contact made between same, when the trammel plate is down against the segments. The tubular legs offer little air resistance, and little visual value, especially while rotating. In their rotation, they also have a fly-wheel effect which tends to give a uniform movement. The tubular structure is, of course, light, but, in addition, takes full advantage of any skin effect that occurs. The rotation of these legs, spokes or dipole halves and of the propeller have a gyroscopic reaction tending to steady the position of the unit as it travels through the air. The use of plural dipoles increases the sensitivity of the antenna in its reflection, as such creates an increased directional presentation to the signals as they flow towards it, in a given time. The use of different lengths of dipoles affords facilities for producing several different reflections so that several readings can be reflected or re-echoed from the same unit.

This type of antenna has a mechanical advantage in breaking the force of the fall of the equipment, when the balloon bursts at high altitudes and drops the instruments. The spread of the legs, spokes or dipole halves and propeller blades helps in this regard, and, as they are extended outwardly, offer resistance to falling, and, then, bend during their contact with the ground. As they bend, they absorb a considerable part of the energy, and prevent the instruments from receiving the full force of the blow. The parachute is provided for a similar purpose. At the present time, targets of this nature are considered expendable; but with this arrangement a certain degree of salvage is possible.

While there has been described what is at present considered to be a preferred embodiment of this invention, it will be obvious to those skilled in the art that various changes and modifications may be made therein without departing from the invention or the principles thereof. It is, therefore, aimed in the appended claims to cover all such changes and modifications as fall within the true spirit and scope of the invention.

What is claimed is:

1. A target unit for aerial operation comprising in combination, aerial means for carrying the unit through the atmosphere, an antenna for reflecting and retransmitting signals of predetermined wave length from an external source, means carried by said aerial means for supporting the antenna and coupling and uncoupling said antenna periodically in such a manner as to vary the reflection of said signals in a predetermined manner.

2. A resonant-reflector target unit for aerial operation comprising in combination, aerial means for carrying the unit through the atmosphere, a horizontal spider-form antenna for reflecting electrical signals from an external source, means carried by said aerial means for supporting the antenna and suspending same in a reciprocating manner so as to control the reflection and retransmission of signals in a predetermined manner, and electrical means for actuating the antenna in said reciprocating manner as the aerial means carries the unit through the atmosphere so as to modify the reception of signals thereby from plural directions.

3. A resonant target unit for aerial operation comprising in combination, aerial means for sustaining and carrying the unit through the atmosphere, a spider-form antenna spaced away from the aerial means for reflecting and retransmitting electrical signals from a distant external source, means carried by said aerial means for supporting the antenna and suspending same in a reciprocating and rotative manner so as to control the reflection and retransmission of signals in a spasmodic manner, and electro-mechanical means for actuating the antenna in said reciprocating manner as the aerial means carries the unit through the atmosphere so as to modify the reception of signals thereby from plural directions.

4. An electronic target unit for aerial operation comprising in combination, aerial means for carrying the unit through the atmosphere, a spider-form antenna spaced away from the aerial means for reflecting and transmitting electronic signals from a distant external source, means carried by said aerial means for supporting the antenna and suspending same in a horizontal plane underneath so as to control the reflection and retransmission of signals in a predetermined manner, and electro-mechanical means for actuating the antenna in a reciprocating manner as the aerial means carries the unit through the atmosphere so as to modify the reception of signals thereby from said source, said spider-form antenna including means for electrically decoupling the arms thereof so they can be shorted or disconnected from each other and of different wavelength during the reciprocating operation.

5. A retransmitting signalling antenna unit comprising in combination, a time-switch, a spider antenna having legs extending free and radially from a central segmental area member of capacitative value, movable means coordinating with said area to derive said value, means for moving said movable means in and out of the influence with the member in a capacitance sense and controlling signalling response through the antenna legs, said last mentioned means being coordinated with said switch for operating it periodically.

6. A retransmitting signalling antenna unit comprising in combination, a meteorological automatically operated instrument, a spider antenna having legs extending free and radially from central segmental area members of predetermined capacitative value, a movable plate coordinating with said area members to derive the said value, mechanical means for moving said movable plate in and out of the influence with the member and antenna in a capacitance sense, and controlling signalling response through the antenna legs, said last mentioned means being coordinated with said meteorological automatically operated instrument.

7. An electronic target unit for aerial operation comprising in combination, aerial means for conveying the unit through the atmosphere, a spider-form antenna spaced away from the aerial means for reflecting electronic signals from a distant external source having its legs ending in segments centrally located in the antenna means carried by said aerial means for supporting the antenna and suspending same rotatively so as to control the reflection of signals of an established wave length coming from said source, contacting means for electrically coupling said segments, and electro-mechanical means for actuating the contacting means as the aerial means carries the unit through the atmosphere so as to control the reception of signals thereby from plural directions having intermittent response, said spider-form antenna including connections for electrically coupling the arms to the segments so they will be disconnected from each other when said contacting means is actuated by said electro-mechanical means at certain periods of its operation.

8. An electronic target unit for aerial operation comprising in combination, aerial means for transferring the unit through the atmosphere, an antenna having tubular dipole halves spread from individual and separating segments centrally located with respect to the unit axis for reflecting electronic signals from an external electronic transmitting scource, a shaft carried by said aerial means for supporting the antenna in a horizontal plane below said means and vertically reciprocating it so as to control the intermittent reflection of signals, propeller means for rotating the antenna in said plane as the aerial means carries the unit through the atmosphere so as to increase the directional sensitivity of electronic signals received thereby from distant transmitting sources, and solenoid mechanism for periodically changing the electrical value of the antenna dipole halves in predetermined sequence by varying their operative lengths.

9. An electronic target unit comprising in combination, balloon means for transferring the unit through the atmosphere, an antenna having legs spread from individual and separating segments centrally located with respect to the unit axis for reflecting electronic signals from an external electronic transmitting source, a shaft carried by said aerial means for supporting the antenna and suspending same in a horizontal plane below said means so as to control the intermittent reflection of signals, propeller means for rotating the antenna legs in said plane as the balloon means carries the unit so as to increase the reception of electronic signals received thereby from distant transmitting sources and solenoid mechanism for periodically changing the wavelength of the antenna legs in predetermined sequence, and a source of electrical energy for energizing the solenoid and operating automatically under the influence of meteorological conditions.

10. A reflecting and retransmitting antenna unit comprising in combination, a balloon, an antenna structure including a set of dipole spokes extending radially and equally spaced from centrally disposed segments separably distinguishing said spokes from each other, means for suspending said structure from the balloon vertically below with the spokes horizontally disposed, a shorting plate for said segments and said spokes, a solenoid supported by said means for raising and lowering said plate and coupling or uncoupling said dipole spokes to vary their responsive wave length and receptive sensitivity to signals from an extraneous source for reflection and retransmission, and a meteorological instrument supported by said means to the balloon for controlling the operation of the solenoid and plate, and the coupling and uncoupling of said antenna.

11. A reflecting and retransmitting antenna unit comprising in combination, a balloon, an antenna structure including a set of dipole spokes projecting radially and equally spaced from individual segments centrally disposed and separably insulating said spokes from each other, means for suspending said structure from the balloon vertically below with the spokes horizontally disposed, a shorting plate for said segments and said spokes, a solenoid supported by said means for raising and lowering said plate and electrically and mechanically coupling or uncoupling said dipole spokes at the segments to vary their operative wave length and receptive sensitivity to signals from an extraneous source for reflection and retransmission, a meteorological instrument with brackets attached supported by said means to the balloon for effecting said operation of the solenoid and plate and the wave response of the spokes, and a propeller attached to said segments but insulated therefrom, for rotating same together, as the balloon rises or lowers through the atmosphere to make the reception of the signals from said source by the antenna structure highly effective.

EDWIN J. ISTVAN.

REFERENCES CITED

The following references are of record in the file of this patent:

UNITED STATES PATENTS

| Number | Name | Date |
|---|---|---|
| 2,151,336 | Scharlau | Mar. 21, 1939 |
| 2,188,649 | Carter | Jan. 30, 1940 |
| 2,216,161 | Curtiss et al. | Oct. 1, 1940 |
| 2,317,071 | Luck | Apr. 20, 1943 |
| 2,366,423 | Pear | Jan. 2, 1945 |

FOREIGN PATENTS

| Number | Country | Date |
|---|---|---|
| 545,880 | Great Britain | June 17, 1942 |